United States Patent
Herman et al.

(10) Patent No.: US 10,677,293 B2
(45) Date of Patent: Jun. 9, 2020

(54) WORK VEHICLE TRANSMISSION DISCONNECT DEVICE CONTROL WITH SHAFT MOUNTED MANIFOLD

(71) Applicant: Deere & Company, Moline, IL (US)

(72) Inventors: Mark A. Herman, La Porte City, IA (US); John J. Gallen, Waterloo, IA (US); Peter D. Wetrich, Waterloo, IA (US); Mark J. Tieszen, Holland, IA (US)

(73) Assignee: DEERE & COMPANY, Moline, IL (US)

( * ) Notice: Subject to any disclaimer, the term of this patent is extended or adjusted under 35 U.S.C. 154(b) by 604 days.

(21) Appl. No.: 15/463,836

(22) Filed: Mar. 20, 2017

(65) Prior Publication Data
US 2018/0266497 A1  Sep. 20, 2018

(51) Int. Cl.
*F16D 25/10* (2006.01)
*F16D 21/04* (2006.01)
(Continued)

(52) U.S. Cl.
CPC ............ *F16D 25/10* (2013.01); *F16D 13/52* (2013.01); *F16D 13/74* (2013.01); *F16D 21/04* (2013.01);
(Continued)

(58) Field of Classification Search
CPC ...... F16D 25/10; F16D 21/04; F16H 57/0473; F16H 63/3026
(Continued)

(56) References Cited

U.S. PATENT DOCUMENTS 4,134,483 A * 1/1979 Horsch ................. F16D 25/123
188/264 E
4,157,750 A  6/1979 Horsch
(Continued)

FOREIGN PATENT DOCUMENTS

DE   1400425    10/1968
GB   973420 A   10/1964

OTHER PUBLICATIONS

German Search Report for Application No. 102018202439.1 dated Dec. 11, 2018.
(Continued)

*Primary Examiner* — Ha Dinh Ho
(74) *Attorney, Agent, or Firm* — Klintworth & Rozenblat IP LLP (57) ABSTRACT

A work vehicle transmission has a disconnect device control assembly. The assembly includes a shaft having a rotation axis extending through a housing of the transmission. A disconnect device is mounted for co-rotation with the shaft about the rotation axis and has disengaged and engaged conditions. A gear is carried by the shaft to rotate about the rotation axis. The gear interacts with the disconnect device to rotate relative to the shaft in the disengaged condition and to co-rotate with the shaft in the engaged condition. A manifold is carried by the shaft and rotationally fixed relative to the rotation axis. The manifold defines a plurality of flow passages configured to route flow to the disconnect device. The manifold has an inner periphery that engages the shaft at a journal interface, which defines a flow passage for flow to pass from at least one of the flow passages of the manifold to the disconnect device.

18 Claims, 9 Drawing Sheets

(51) Int. Cl.
  *F16H 57/04* (2010.01)
  *F16H 63/30* (2006.01)
  *F16D 48/02* (2006.01)
  *F16D 13/52* (2006.01)
  *F16D 13/74* (2006.01)
  *F16D 25/0638* (2006.01)
  *F16D 25/12* (2006.01)
  *F16H 61/30* (2006.01)
  *F16D 13/72* (2006.01)

(52) U.S. Cl.
  CPC ....... *F16D 25/0638* (2013.01); *F16D 25/123* (2013.01); *F16D 25/14* (2013.01); *F16H 57/0473* (2013.01); *F16H 61/30* (2013.01); *F16H 63/3026* (2013.01); *B60Y 2200/221* (2013.01); *F16D 13/72* (2013.01)

(58) Field of Classification Search
  USPC ......................................................... 74/335
  See application file for complete search history.

(56) References Cited

U.S. PATENT DOCUMENTS

| | | | | |
|---|---|---|---|---|
| 4,529,073 | A | * | 7/1985 | Lewis ................... F16D 25/063 192/113.36 |
| 4,648,495 | A | * | 3/1987 | Vater .................... F16D 25/123 192/113.36 |
| 4,827,784 | A | * | 5/1989 | Muller .................... F16D 25/10 192/106 F |
| 4,905,812 | A | * | 3/1990 | Shepperd ................ F16D 13/72 192/113.36 |
| 5,613,588 | A | * | 3/1997 | Vu ...................... F16D 25/0638 188/264 B |

OTHER PUBLICATIONS

Applicant Deere & Company, Forkless Synchronizer With Sensor Rail Arrangement, pending U.S. Appl. No. 15/421,739, filed Feb. 1, 2017.
Applicant Deere & Company, Hydraulic Synchronizer, pending U.S. Appl. No. 15/187,636, filed Jun. 20, 2016.
4450 Power Shift Transmission, excerpt cross-section showing manifold "74", Deere & Company, Jun. 1982.
Manifold with Sleeve, part No. RE10392, Deere & Company, Jul. 1981.

* cited by examiner

WORK VEHICLE TRANSMISSION DISCONNECT DEVICE CONTROL WITH SHAFT MOUNTED MANIFOLD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more specifically, to work vehicle transmissions and disconnect device control arrangements thereof.

BACKGROUND OF THE DISCLOSURE

Work vehicles of all sorts, such as those in the agriculture, construction, forestry, mining and other industries, may include a transmission arrangement to change the speed and torque applied from a power source (e.g., diesel engine) to various components (e.g., drive wheels) of the work vehicle. Such transmissions may include various arrangements for effecting a change in gear ratio. Often, the transmission may include multiple gears that are selectively coupled to one or more rotating shafts by disconnect devices, which are driven by various mechanical, electric, hydraulic or electro-hydraulic mechanisms. For example, electro-hydraulic control valves may be used to supply hydraulic pressure to various clutches or synchronizers that selectively engage or disengage associated gears with the shaft. Routing the control pressure, and cooling and lubricating fluid, to the disconnect devices, while necessary, complicates manufacturing and assembly of the transmissions.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

In one aspect, the disclosure provides a disconnect device control assembly for a work vehicle transmission. The assembly includes a shaft having a rotation axis extending through a housing of the transmission. A disconnect device is mounted for co-rotation with the shaft about the rotation axis and has disengaged and engaged conditions. A gear is carried by the shaft to rotate about the rotation axis. The gear interacts with the disconnect device to rotate relative to the shaft in the disengaged condition of the disconnect device and to co-rotate with the shaft in the engaged condition of the disconnect device. A manifold is carried by the shaft and rotationally fixed relative to the rotation axis. The manifold defines a plurality of flow passages configured to route flow to the disconnect device. The manifold has an inner periphery that engages the shaft at a journal interface, which defines a flow passage for flow to pass from at least one of the flow passages of the manifold to the disconnect device.

Another aspect of the disclosure provides a clutch control assembly for a transmission. The assembly includes a shaft having a rotation axis extending through a housing of the transmission. A clutch is mounted for co-rotation with the shaft about the rotation axis. The clutch has an actuator piston and a friction pack movable into a disengaged condition and an engaged condition. A gear is carried by the shaft to rotate about the rotation axis. The gear interacts with the clutch to rotate relative to the shaft in the disengaged condition of the clutch and to co-rotate with the shaft in the engaged condition of the clutch. A manifold is carried by the shaft and rotationally fixed relative to the rotation axis. The manifold defines a plurality of flow passages configured to route flow to the clutch. The manifold has an inner periphery that engages the shaft at a journal interface, which defines a flow passage for flow to pass from at least one of the flow passages of the manifold to the clutch. The flow passages of the manifold include a clutch control passage and a clutch lubrication passage. The clutch control passage is configured to route relatively high pressure flow to an upstream side of the actuator piston. The clutch lubrication passage is configured to route relatively low pressure flow to the journal interface, and therefrom to a downstream side of the actuator piston.

Another aspect of the disclosure provides a transmission for a work vehicle having a transmission housing, a transmission shaft mounted to the housing for rotation about a rotation axis, a gear carried by the shaft to rotate about the rotation axis, and a clutch control assembly. The clutch control assembly includes a clutch and a manifold. The clutch is mounted for co-rotation with the shaft about the rotation axis and has a disengaged condition in which the gear rotates relative to the shaft and an engaged condition in which the gear co-rotates with the shaft. The manifold is carried by the shaft and rotationally fixed relative to the rotation axis. The manifold defines a plurality of flow passages configured to route flow to the clutch. The manifold has an inner periphery that engages the shaft at a journal interface, which defines a flow passage for flow to pass from at least one of the flow passages of the manifold to the clutch.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a disconnect device control assembly for work vehicles, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The terms "above," "below," and "vertical," as appearing herein, refer to an axis or a direction orthogonal to the horizontal plane containing the fore-aft and lateral axes. Further, the term "axial" as used herein refers to a direction that is generally parallel to an axis of rotation, axis of symmetry, or centerline of a component or components. For example, in a component with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" spaced even though one or both components may not overlap or may not be cylindrical (or otherwise radially symmetric).

Certain conventional transmission arrangements use hydraulic pressure to lubricate and cool moving components as well as to control one or more operations of the transmission, aptly the connection and disconnection of gears to rotating shafts. Hydraulic pressure is either applied to or cut from various disconnect components, such as clutches and synchronizers, to move a selected gear to either engage or disengage the rotating shaft, and thereby either co-rotate with the shaft or remain stationary or rotate relative to the shaft. Certain conventional transmission arrangements may route the hydraulic pressure through the shaft, which may require complicated manufacturing and assembly processes to complete the routing to the disconnect devices in a sealed manner. Other transmission arrangements may use a manifold to distribute the hydraulic pressure. However, in such cases the manifold is mounted in a fixed connection to the transmission housing, thereby requiring special mounting structure and reducing the ability of the control assembly to be readily used in other vehicle platforms.

The following describes one or more example implementations of the disclosed control assembly for a transmission disconnect device as shown in the accompanying figures. The disclosed control assembly, its method of operation, manufacture and assembly, and provide a number of benefits as compared to conventional systems.

The disclosed disconnect device control system includes a manifold for routing hydraulic pressure from one or more control valves of the vehicle hydraulic system to one or more disconnect devices. In certain embodiments, the manifold is coupled to the system in a floating connection allowing for relative (e.g., axial) movement of the manifold with respect to the transmission shaft. The manifold may be anti-rotated by a pin and slot arrangement that may be coupled to the transmission housing via a bracket. The bracket, and the pin and slot arrangement, may be arranged above or at a top side of the manifold, with the long dimension of the slot extending generally parallel with the rotation axis of the shaft.

In certain embodiments, the manifold may be mounted such that its weight is not supported by the housing, or any connecting features (e.g., brackets). Instead, the manifold may be supported by the shaft via a journal interface at which the shaft rotates relative to the manifold. As mentioned, the manifold may be anti-rotated by a pin and slot and bracket arrangement, and be capable of floating axially and/or radially within various constraints of the system (e.g., dimensional tolerances, the presence of components and so on). The shaft-mounted arrangement avoids the need for more robust mounting hardware to support the manifold, and along with the floating connection, also avoids fixing the physical mounting location of the manifold with respect to the transmission housing. As a result, various components (e.g., the manifold and disconnect devices) of the disclosed control assembly manifold may be readily utilized in various transmissions or vehicle platforms.

In certain embodiments, the manifold routes multiple pressures to one disconnect device, and other embodiments, one or more pressures are routed to multiple disconnect devices. For example, the manifold may route a separate flow stream of relatively high pressure control pressure to each of one or more disconnect devices. The manifold may also route separate flow streams or a combined flow stream of relatively low pressure lubrication/cooling fluid to multiple disconnect devices. The disconnect device or devices may be of any suitable construction to effect coupling and decoupling of one or more gears with the shaft via hydraulic pressure, including various forked and forkless hydraulic synchronizers and various clutch arrangements, such as the wet friction disk clutch arrangement described below.

Figure 1:
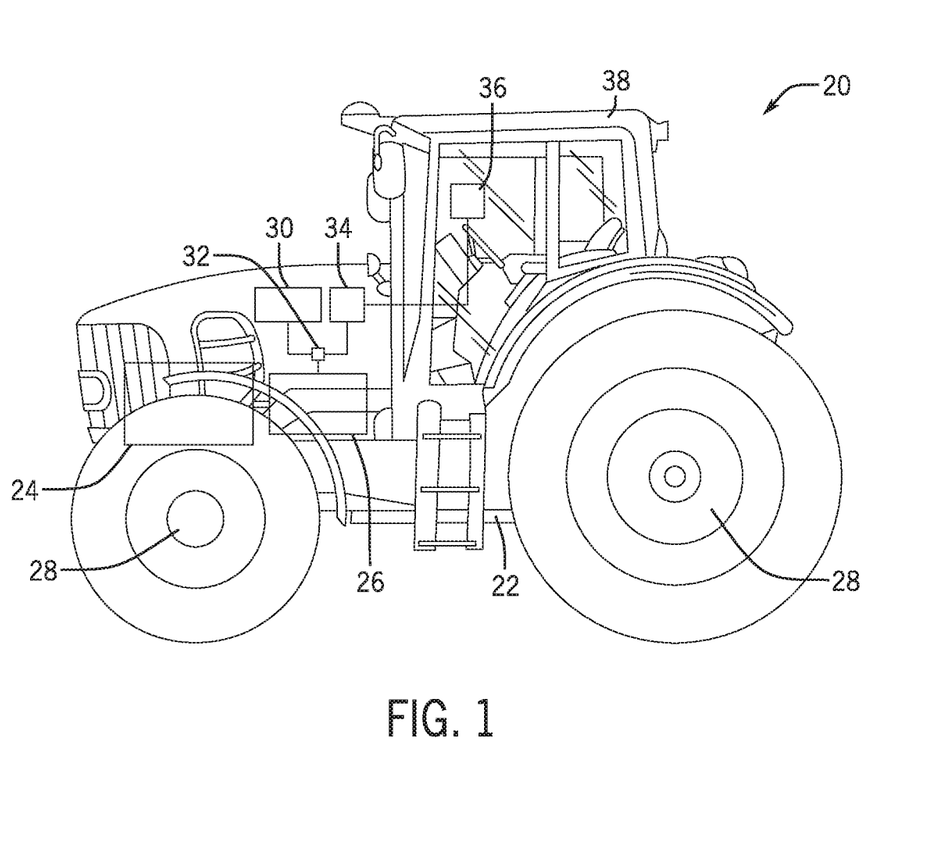
FIG. 1 is a side view of an example work vehicle in the form of an agricultural tractor having a transmission with a disconnect device control assembly according to this disclosure.

Referring now to the drawings, the disclosed disconnect device control assembly may be utilized in the context of a wide range of work vehicles, including, agricultural tractors, such as shown in FIG. 1. In this regard, while a tractor is illustrated and described herein as an example work vehicle, one skilled in the art will recognize that principles of the disclosed arrangement may be adapted for use in other types of work vehicles, including, for example, various other agricultural machines, and other vehicles or stationary machines used in the construction, forestry, mining or other industries. As such, the present disclosure should not be limited to applications associated with a tractor or the particular example tractor shown and described.

As shown in FIG. 1, the work vehicle 20 includes a vehicle frame 22. Supported on the vehicle frame 22 is a source of propulsion 24 that supplies power to a transmission 26. In one example, the source of propulsion 24 is an internal combustion engine, such as a diesel engine, that is controlled by an engine control module. It should be noted that other forms of propulsion may be provided, such as a fuel cell, an electric motor, a hybrid gas-electric power plant, etc. The transmission 26 transfers the power from the engine to a suitable driveline coupled to one or more driven wheels 28 of the work vehicle 20 to enable the work vehicle 20 to travel over the terrain. The work vehicle 20 includes an electrohydraulic system with one or more hydraulic pumps 30 and electrohydraulic control valves 32 operated by one or more controllers 34 to control operational modes of the transmission 26. Information related to the transmission (e.g., current drive mode or gear) or other vehicle systems may be relayed to the operator via an operator interface 36 (e.g., display screen) in an operator cabin 38.

Figure 2:
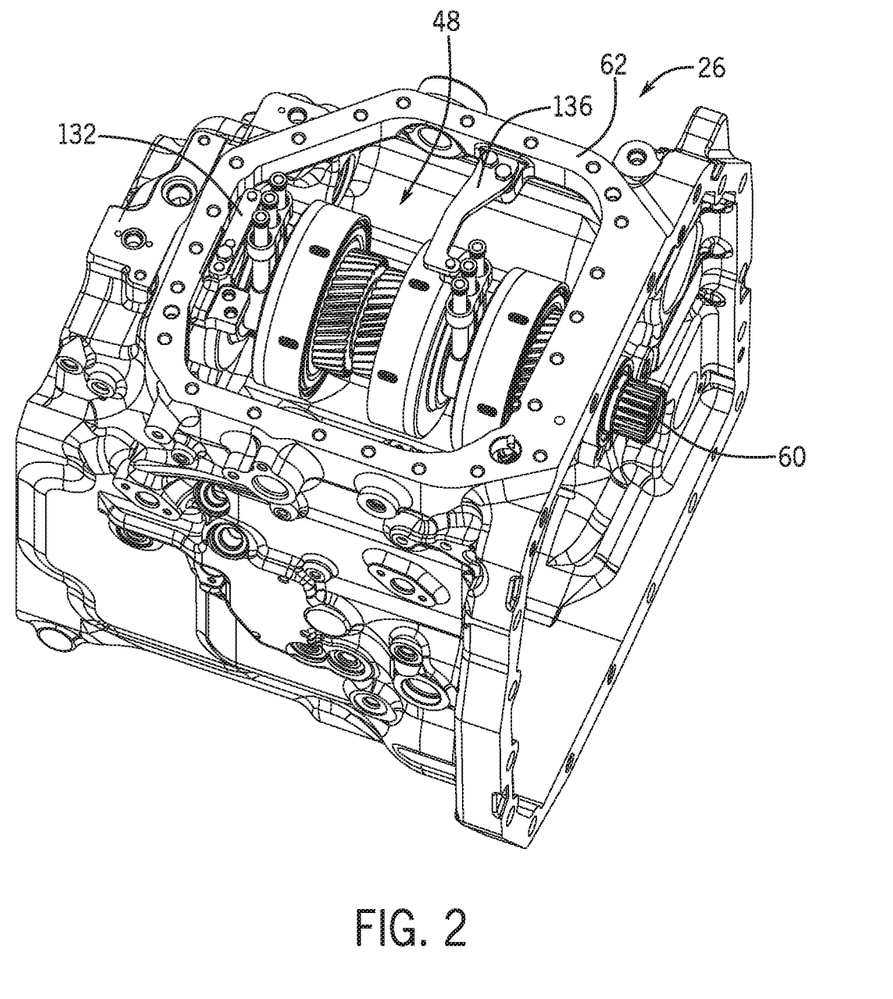
FIG. 2 is a perspective view showing an example disconnect device control assembly contained in a housing of the transmission for the work vehicle of FIG. 1.
Figure 3:
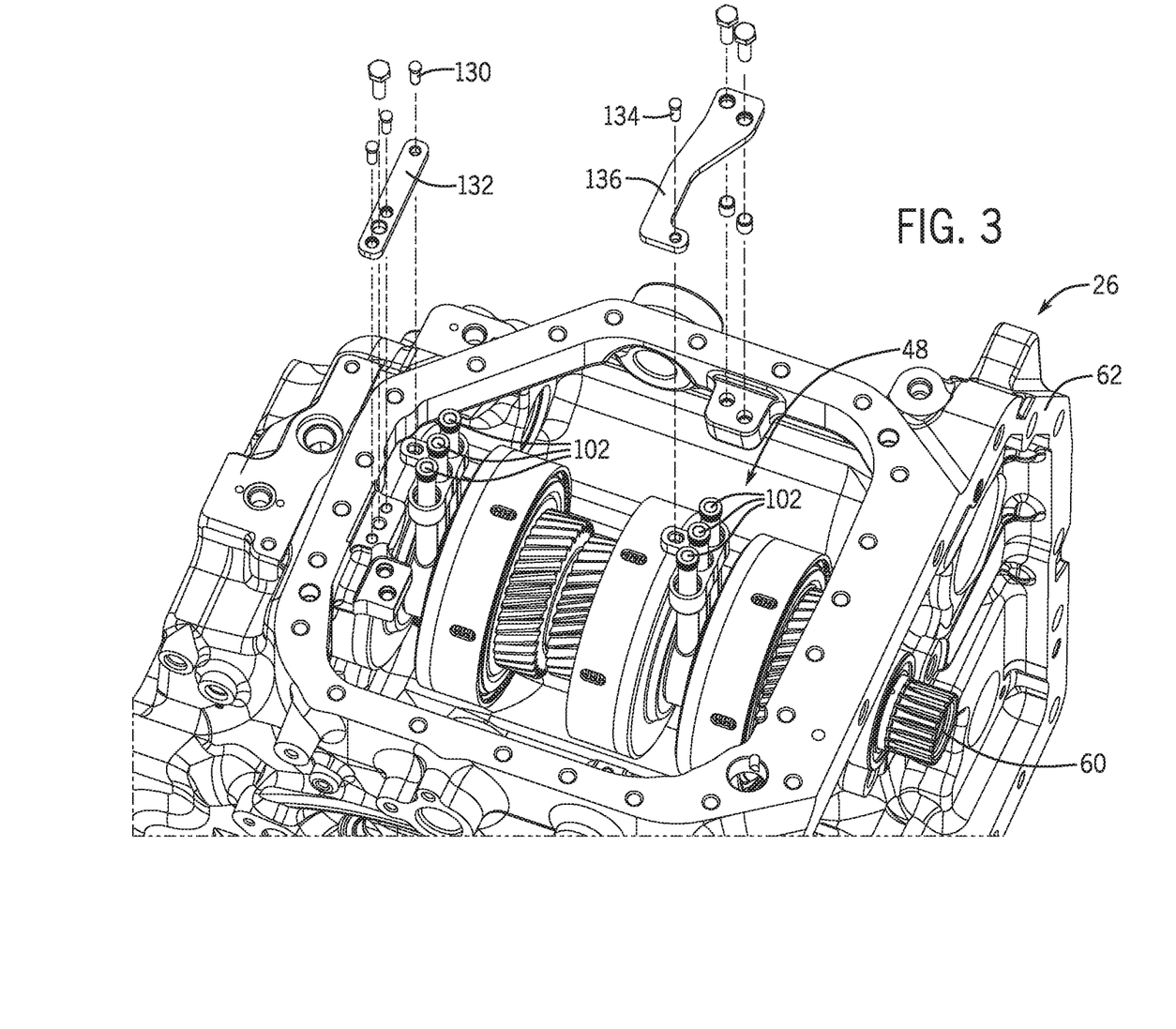
FIG. 3 is a partial perspective view thereof showing manifold anti-rotation brackets exploded from the transmission housing.
Figure 4:
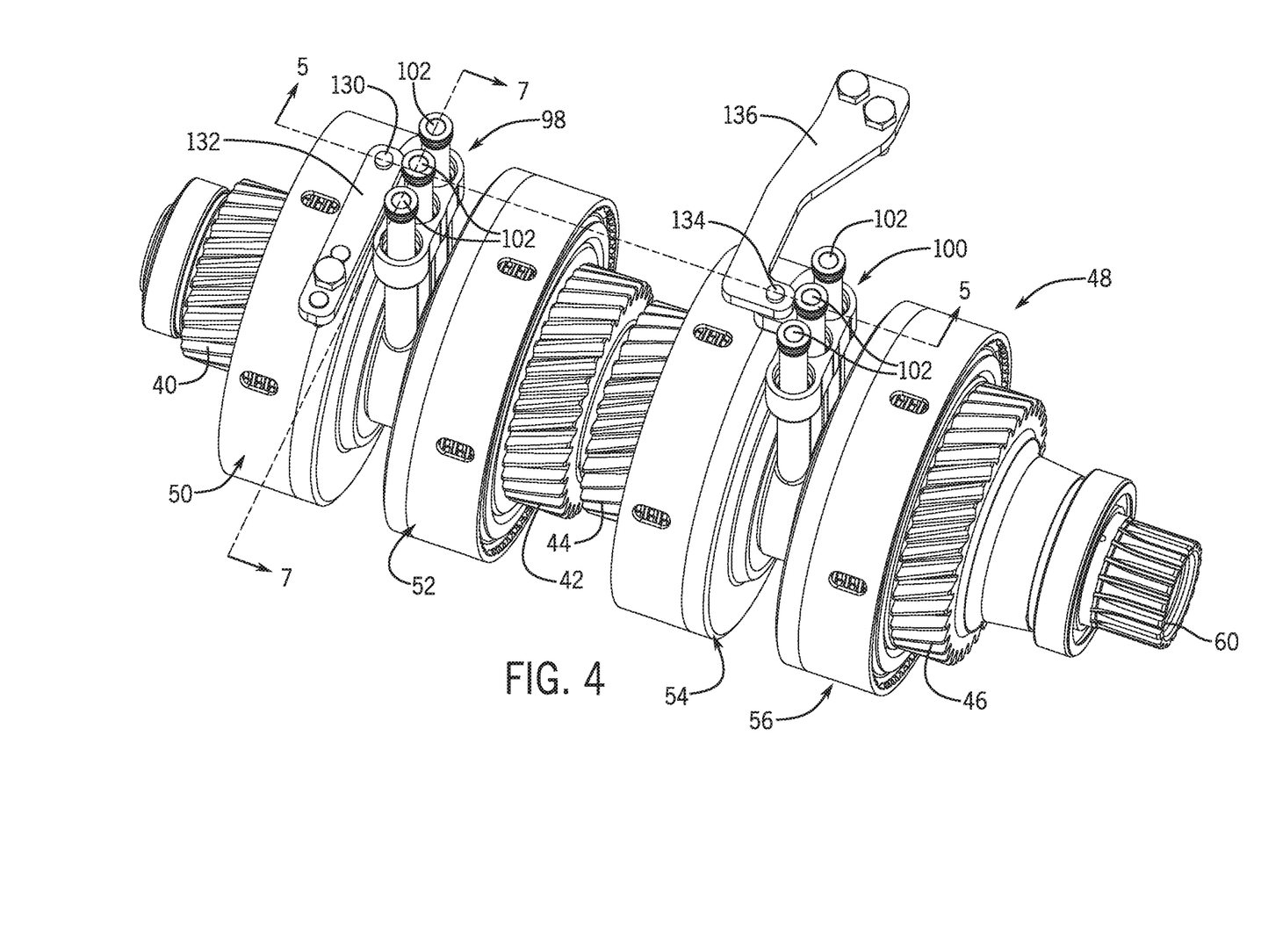
FIG. 4 is a perspective view of the example disconnect device control assembly in isolation.
Figure 5:
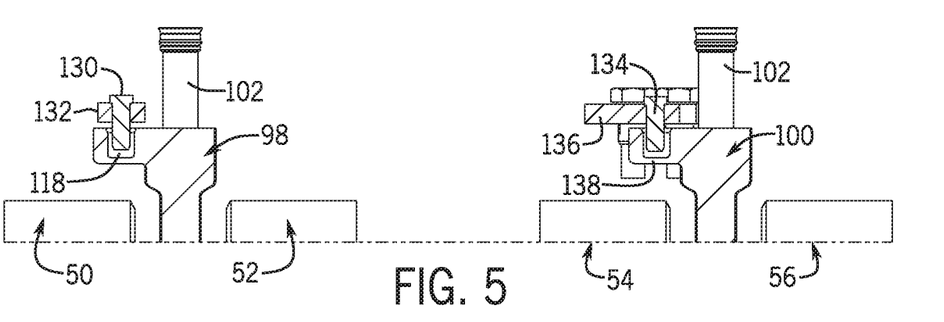
FIG. 5 is an enlarged section view taken along line 5-5 of FIG. 4 detailing a pin and slot anti-rotation arrangement for the manifold.

Referring now also to FIGS. 2-3, the transmission 26 may include one or more gears for forward and rearward motion of the work vehicle 20, including multiple forward speed gears, such as gears 40, 42, 44, 46 each having a different diameter and/or tooth count and thus providing a different gear ratio, for propelling the work vehicle 20 at various speeds. To transition between gears, such as between the gears 40, 42, 44, 46 the transmission 26 includes a control assembly 48 including one or more disconnect devices, which in the illustrated example include four wet, friction clutches 50, 52, 54, 56 disposed axially between the gears 40, 42, 44, 46, all of which may be concentric with a rotation axis "R" about which a transmission shaft 60 rotates. The transmission shaft 60, the gears 40, 42, 44, 46, the control assembly 48, and the clutches 50, 52, 54, 56 are all arranged within a transmission housing 62, and are configured to receive and transmit power from the engine by the selective engagement of one of the gears 40, 42, 44, 46 with the shaft 60 and one or more gears of one or more other shafts (e.g., idler, counter and output shafts), as known in the art.

The gears 40, 42, 44, 46 may be mounted directly to smooth sections of the shaft 60, or on various bushings or collars, so that that the shaft 60 may rotate relative to the gears 40, 42, 44, 46 until a selected one of the gears 40, 42, 44, 46 is engaged by one of the clutches 50, 52, 54, 56. The clutches 50, 52, 54, 56 may be configured differently or substantially the same, as in the illustrated example, with each clutch 50, 52, 54, 56 mounted to the shaft 60 for co-rotation about the rotation axis R at all times. For simplicity, only one of the clutches 50, 52, 54, 56, namely clutch 50, will be described in detail herein. However, it will be understood that the following or like description will apply to the other clutches 52, 54, 56, and that all the clutches 50, 52, 54, 56 are hydraulically operated to either engage or disengage (or both) the associated gear 40, 42, 44, 46 with the shaft 60 by applying hydraulic control pressure (via the hydraulic pump(s) 30 and control valve(s) 32) to an actuator piston, and thereby a friction pack, of each clutch 50, 52, 54, 56.

Figure 8:
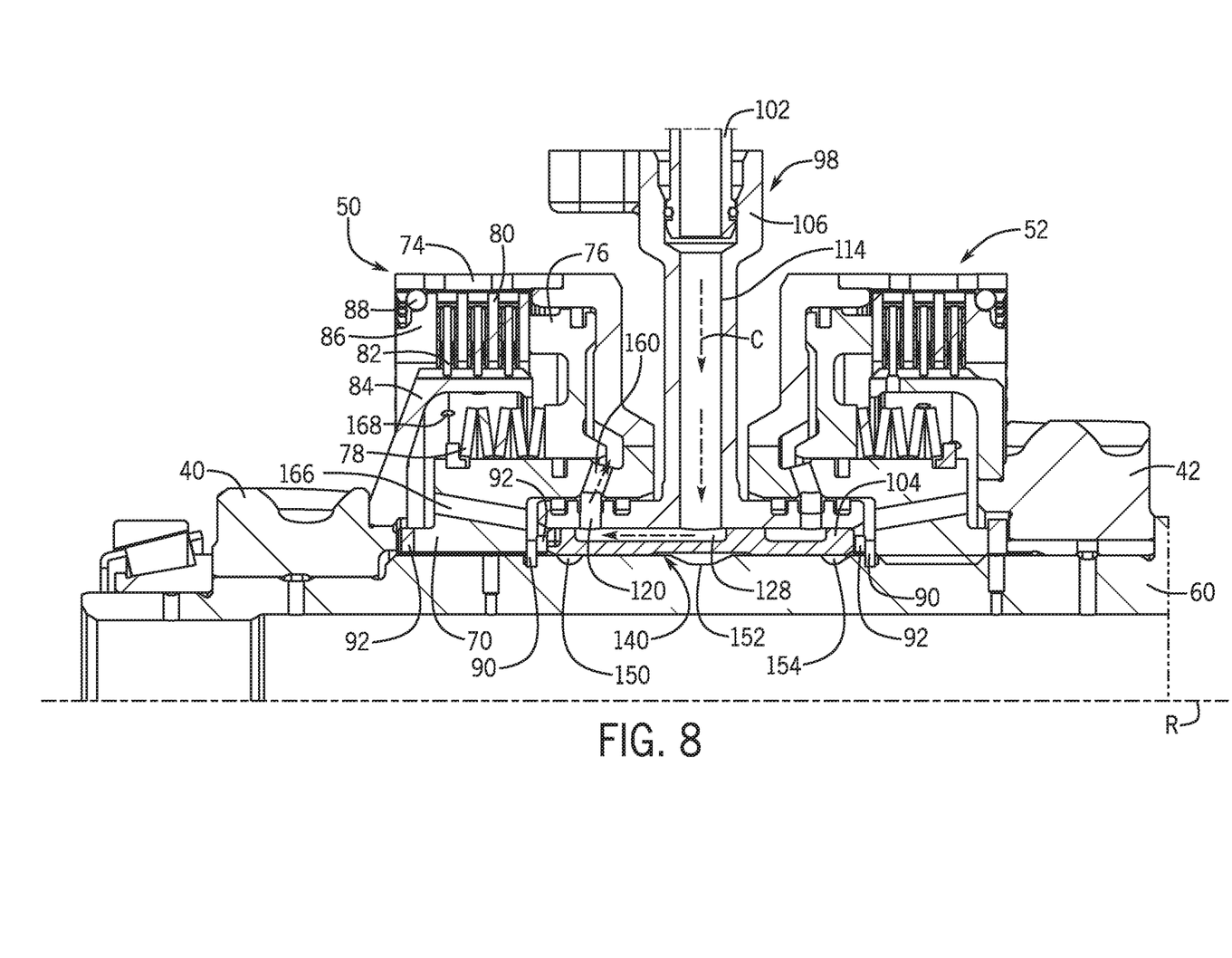
FIG. 8 is a partial sectional view take along line 8-8 of FIG. 7 showing an example control pressure flow path.
Figure 9:
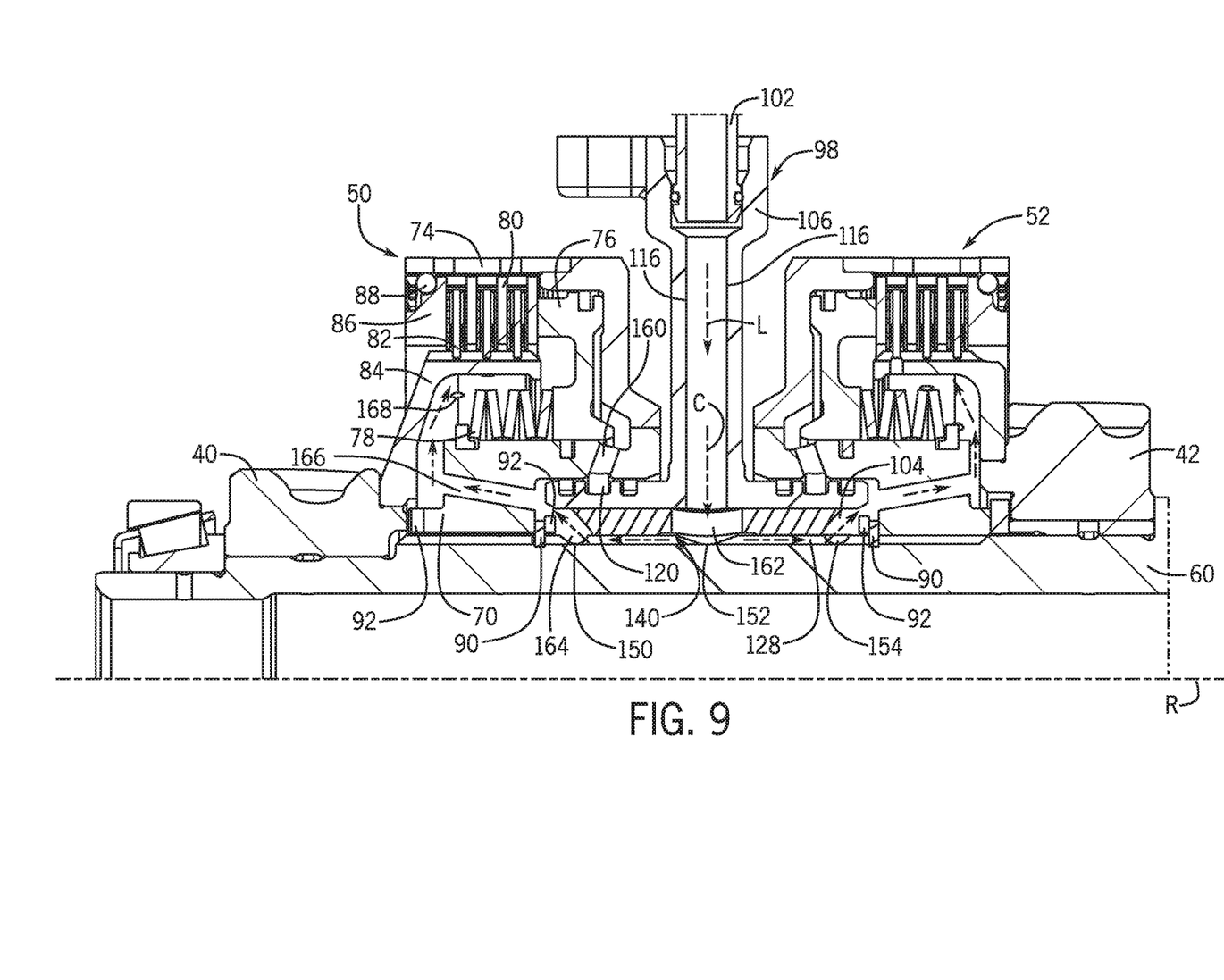
FIG. 9 is a partial sectional view take along lines 9-9 of FIG. 7 showing an example lubrication fluid flow path.
Figure 10:
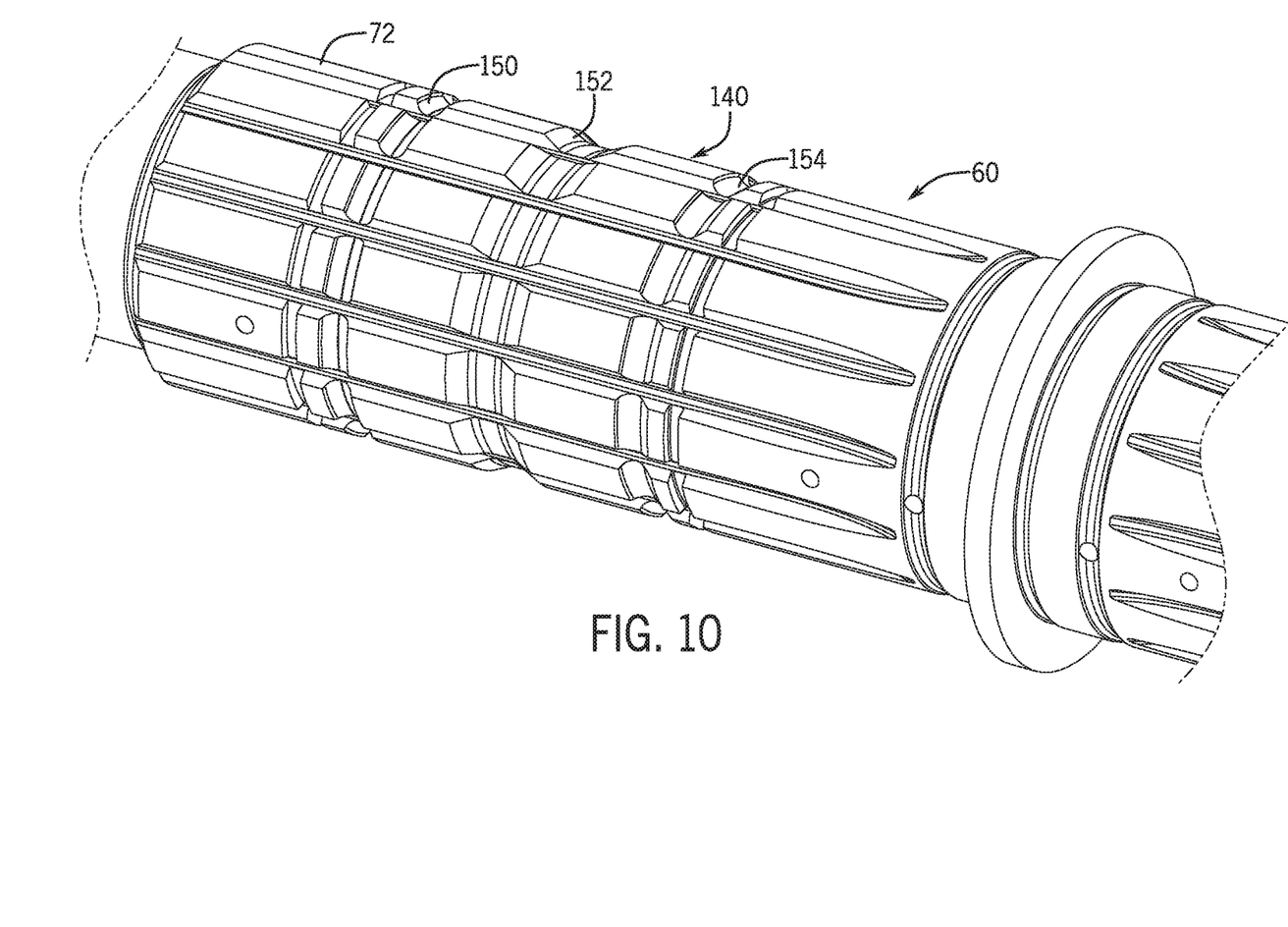
FIG. 10 is a partial perspective view of an example transmission shaft for use with example disconnect device control assembly.

Referring also to FIGS. 8-10, the clutch 50 includes a clutch hub 70 or the like that is mounted to the shaft 60 for co-rotation at all times, such as via mating splines 72, or via other mating toothed or multi-sided sections of the shaft 60 and the clutch hub 70. In this way, engine torque is applied through the shaft 60 and the clutch hub 70 of the clutch 50, and when engaged, to the gear 40. The clutch hub 70 forms a piston chamber for an annular actuator piston 76, which, in the illustrated example, is biased to a disengaged condition by a return spring or spring pack 78 (e.g., one or more Belleville springs). The clutch hub 70 mounts a clutch drum 74 that houses a friction pack made of interleaved separator plates 80, which are splined to an inner periphery of the clutch drum 74, and friction disks 82, which are splined to the outer periphery of a collar 84 of the gear 40. The open axial end of the clutch drum 74 is closed off by an annular end plate 86, which is also splined to the inner periphery of the clutch drum 74, and secured by a retaining ring 88 (e.g., a snap ring). The clutch 50 is axially located by another retaining ring 90 (e.g., a snap ring) mounted to the shaft 60 at one axial side of the clutch hub 70 and by the gear 40 at the other axial side of the clutch hub 70, in some cases with a thrust washer 92 therebetween. The gear 40 is located by abutment with a radial shoulder of the shaft 60. As will be described below, application of control pressure to the actuator piston 76 moves it against the return spring 78 (leftward in FIG. 8) and causes the separator plates 80 to press against the friction disks 82 and the end plate 86 until the gear 40 is coupled to the clutch 50. In this engaged condition of the clutch 50, the gear 40 will co-rotate with the shaft 60 about the rotation axis R. Reducing or eliminating control pressure to the actuator piston 76 allows the return spring 78 to move the actuator piston 76 into the disengaged condition in which the gear 40 is disengaged from, and rotates relative to, the shaft 60. Having described the illustrated clutch in detail, it is noted that clutch configurations, and disconnect devices, other than that shown and described herein may be utilized with the disclosed control assembly.

Hydraulic pressure is applied to the clutches 50, 52, 54, 56 via one or more manifolds, such as manifolds 98, 100 in the illustrated example. The manifolds 98, 100 may couple to the vehicle hydraulic system directly or through one or more jumper tubes 102 (see FIG. 2) that connect to porting (not shown) of the control valve(s) 32. The manifolds 98, 100 may differ or have the same configuration, as illustrated. For simplicity, only manifold 98 will be described in detail, although it will be understood that the construction and operation described also applies to the manifold 100 (although as it pertains to gears 44, 46 and clutches 54, 56).

Figure 6:
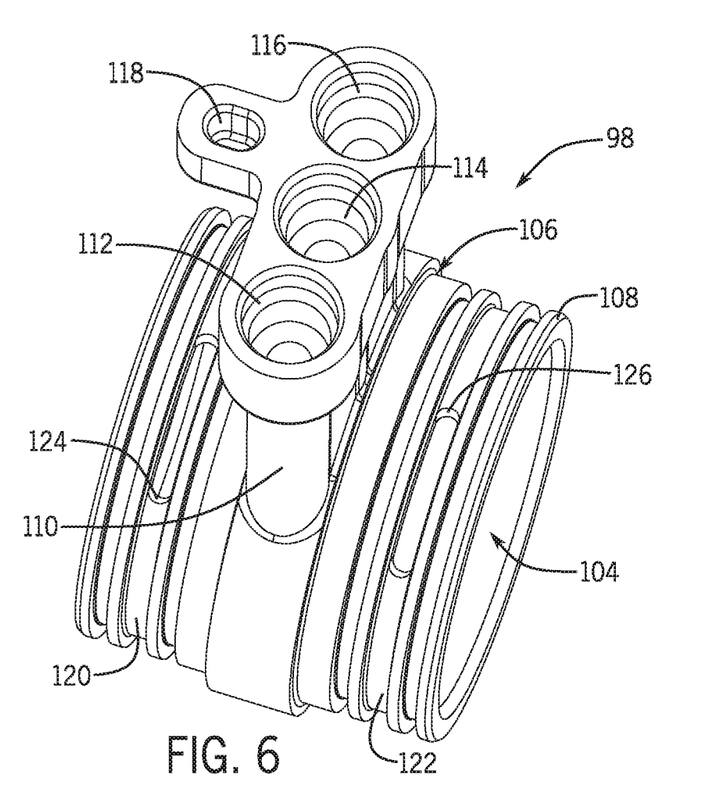
FIG. 6 is a perspective view of an example manifold.
Figure 7:
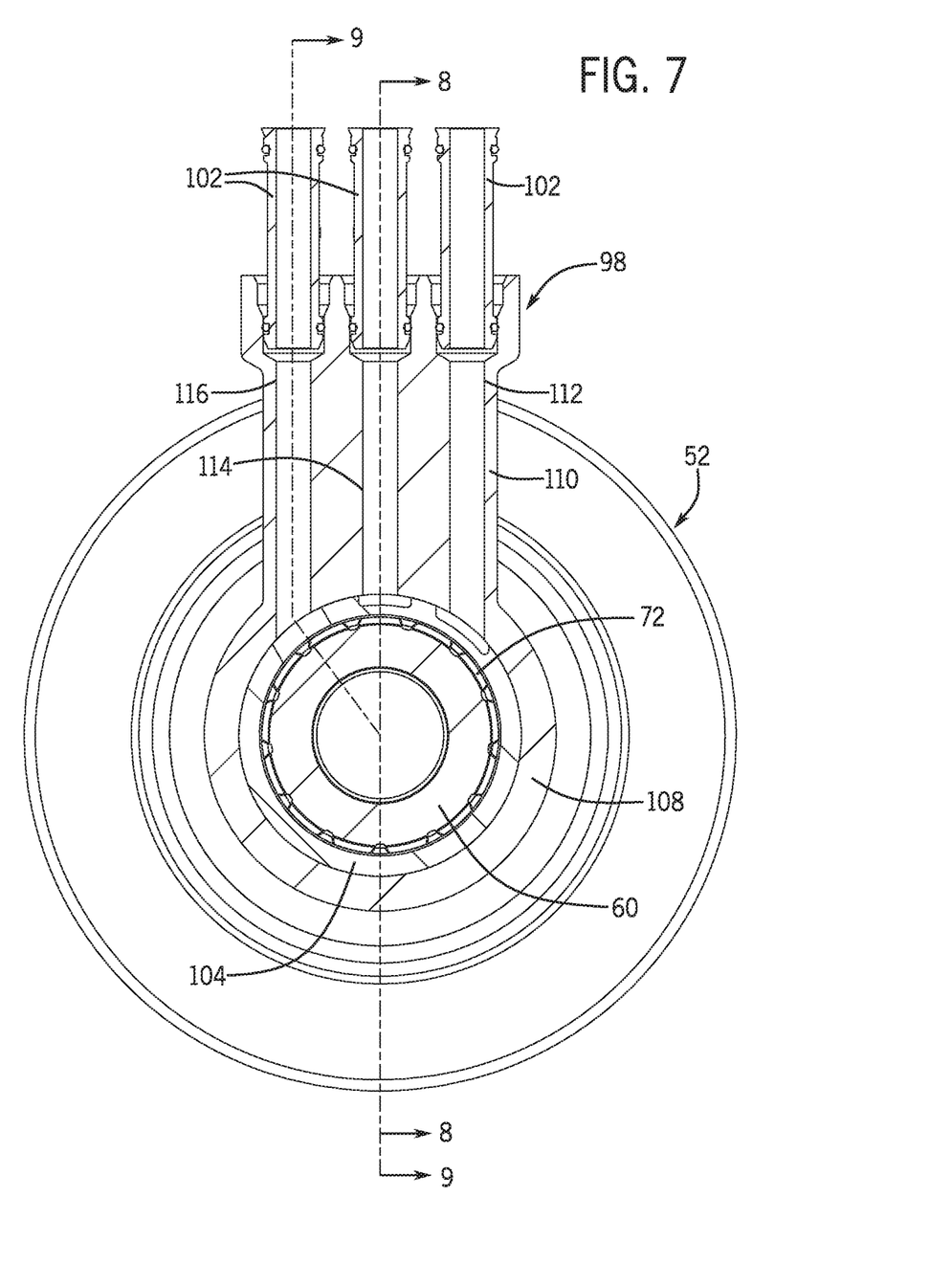
FIG. 7 is a sectional view taken along line 7-7 of FIG. 4 showing flow passages of the manifold of FIG. 6.

Referring now also to FIGS. 6 and 7, the example manifold 98 has two parts, including an inner sleeve 104 and a main body 106. The main body 106 includes a barrel section 108 in which the inner sleeve 104 is fixedly connected (e.g., via a press-fit) and an upstanding section 110 which defines portions of flow passages 112, 114, 116. At the top of the upstanding section 110 of the main body 106 is a slot 118, which has its long dimension aligned with (e.g., parallel to) the rotation axis R when the manifold 98 is mounted to the shaft 60. The barrel section 108 of the main body 106 has a circumferentially grooved outer periphery, including two flow channels 120, 122, each of which is axially flanked by two seal grooves. The flow channels 120, 122 each have a circumferential slot 124, 126 that opens to the inner sleeve 104, and in particular, to two pockets or cavities therein, one cavity 128 is shown in FIG. 8. The flow passages 112, 114, 116 include two relatively high pressure control pressure passages 112, 114, and one relatively low pressure lubrication/cooling flow passage 116.

The manifold 98 may serve to route one or more pressure streams to one or multiple clutches, such as clutches 50, 52 in the illustrated example, in which case the manifold 98 is mounted to the shaft 60 axially between the clutches 50, 52, and the manifold 100 is mounted to the shaft 60 axially between the clutches 54, 56. In this way, the manifolds 98, 100 may be considered dual or two-way manifolds, since they each function to control two clutches, and thereby, two gears.

Since the manifolds 98, 100 are mounted directly to the rotating shaft 60, and would thus would tend to co-rotate or otherwise rotate relative to the shaft 60, an anti-rotation arrangement is used to fix the rotational orientation of each manifold 98, 100. Referring also to FIGS. 2-3 and 5-6, and with respect to the manifold 98, an example anti-rotation arrangement includes a pin 130 mounted to (e.g., via press-fit into an opening of) a free end of a bracket 132 that is fixedly connected (e.g., via bolts) in cantilever fashion to the transmission housing 62. A lower end of the pin 130 is sized and located to fit into the slot 118 at the top of the upstanding section 110 of the main body 106. As noted above, the long dimension of the slot 118 is generally aligned with (e.g., parallel to) the rotation axis R when the manifold 98 is mounted to the shaft 60. As the only coupling to the transmission housing 62, the pin 130 and slot 118 arrangement gives the manifold 98 a "floating" connection, allowing for axial and radial movement of the manifold 98 relative to the shaft 60 within various constraints of the system, such as the retaining rings 90 and thrust washers 92 mounted to the shaft 60 at each axial side of the manifold 98. Both the pin 130 and the bracket 132 are positioned vertically above the manifold 98, with the slot 118 opening upward, such that no upward radial supporting force is applied to the manifold 98, nor for that matter is a downward radial force applied to the manifold 98 due to the spacing of the lower end of the pin 130 from the floor of the slot 118. Axial forces are also not applied to the manifold 98, but rather, only an angular (e.g., clockwise or counter-clockwise) reaction force is applied to the manifold 98 having an orientation and magnitude necessary to counteract rotational forces from the rotation of the shaft 60 to maintain a substantially fixed angular orientation of the manifold 98.

Supporting force for the weight of each manifold 98, 100 is provided by the shaft 60, such that their weight is not directly supported by the transmission housing 62, or any connecting features (e.g., bracket 132), and if the shaft 60 is supported elsewhere, the manifolds 98, 100 may not be supported by the transmission housing 62 at all. The manifolds 98, 100 mount to the shaft 60 via journal interfaces, including journal interface 140 for the manifold 98, at which the shaft 60 rotates relative to the manifolds 98, 100. The shaft-mounted connection avoids the need for more robust mounting hardware to support the manifolds 98, 100, and along with the floating connection, also avoids fixing the physical mounting locations of the manifolds 98, 100 with respect to the transmission housing 62. As a result, various components (e.g., the manifolds 98, 100 and clutches 50, 52, 54, 56) may be readily utilized in various transmissions or vehicle platforms.

Referring again to FIGS. 8-10 with respect to the manifold 98, the journal interface 140 is defined in part by the manifold 98, specifically the inner periphery of the inner sleeve 104, and the splined outer periphery of the shaft 60. The inner periphery of the inner sleeve 104 journals about the radially outermost surfaces of the shaft splines 72. In the absence of hydraulic pressure, these surfaces will physically mate and provide bearing surfaces for the shaft 60 to rotate while supporting the manifold 98. When pressurized sufficiently, and with sufficient radial clearance and tolerances, the hydraulic fluid may provide a hydrodynamic layer or bearing on which the manifold 98 will ride as the shaft 60 rotates and supports the manifold 98. Further, the journal interface 140 defines one or more flow passages for hydraulic fluid, including at the recessed grooves of the outer periphery of the shaft 60 between the splines 72 and at circumferential channels formed in the outer periphery of the shaft 60, namely axially spaced apart circumferential channels 150, 152, 154. The circumferential channels 150, 152, 154 and the portions of the spline grooves at the journal interface 140 form part of the flow network of the manifold 98, and with respect to the illustrated example, the relatively low pressure lubrication/cooling flow passage to the clutches 50, 52, as will now be described.

The control pressure flow path for the clutch 50 is shown in FIG. 8 by the arrows "C". Specifically, relatively high pressure fluid is routed to the flow passage 114 in the main body 106 of the manifold 98 and directed to the cavity 128 in the inner sleeve 104 of the manifold 98. From the cavity 128, pressure is routed to the slot 124 and into the flow channel 120 at the outer periphery of the barrel section 108 of the main body 106 of the manifold 98. Pressurized fluid then leaves the manifold 98 and passes through one or more generally radial control ports 160 in the clutch hub 70 where it reaches an upstream side of the actuator piston 76. The relatively high pressure will overcome the force of the return spring 78 (and residual fluid) to move the actuator piston 76 and cause the clutch 50 to engage the gear 40 with the shaft 60. Various seals are seated in grooves to seal off the upstream pressure side of the piston chamber and the interface between the manifold 98 and the clutch hub 70. Although not shown, it should be understood that the manifold 98 provides control pressure routing in a similar manner as shown and described with respect to FIG. 8.

The lubrication/cooling pressure flow path for the clutch 50 is shown in FIG. 9 by the arrows "L". Specifically, relatively low pressure fluid is routed to the flow passage 116 in the main body 106 of the manifold 98 and directed through an opening 162 in the inner sleeve 104 of the manifold 98. Pressurized fluid then leaves the manifold 98 and passes to the journal interface 140, and specifically radially and circumferentially into the channel 152 in the shaft 60, axially through the grooves between the splines 72 and through the channels 150 and 154 in the shaft 60. From there, the pressurized fluid flows back into the manifold 98 through notches 164 at the axial ends of the inner sleeve 104 to bypass the retaining rings 90 and thrust washers 92 to reach the clutches 50 and 52. The fluid flows into one or more lubrication/cooling ports 166 in each clutch hub 70 to a downstream, low pressure side of the actuator piston 76. From there, the fluid flows, largely by centrifugal force, through radial openings 168 in the gear collar 84 where it is dispersed onto the friction pack. Although not shown, the manifold 100 provides control and lubrication/cooling pressure routing to the clutches 54, 56 in a similar manner as described with respect to the manifold 98 and shown in FIGS. 8 and 9.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A disconnect device control assembly for a transmission of a work vehicle, the assembly comprising:
   a shaft having a rotation axis extending through a housing of the transmission;
   a disconnect device mounted for co-rotation with the shaft about the rotation axis and having a disengaged condition and an engaged condition;
   a gear carried by the shaft to rotate about the rotation axis, the gear interacting with the disconnect device to rotate relative to the shaft in the disengaged condition of the disconnect device and to co-rotate with the shaft in the engaged condition of the disconnect device; and
   a manifold carried by the shaft and rotationally fixed relative to the rotation axis, the manifold defining a plurality of flow passages configured to route flow to the disconnect device;
   wherein the manifold has an inner periphery that engages the shaft at a journal interface defining a flow passage for flow to pass from at least one of the flow passages of the manifold to the disconnect device; and
   wherein the manifold is restrained against rotation about the rotation axis by a pin extending above the manifold.

2. The assembly of claim 1, wherein the pin is mounted to a bracket coupled to the housing and extending above the manifold.

3. The assembly of claim 1, wherein a lower end of the pin is received in an oblong slot defined by the manifold, the slot having a long dimension substantially extending parallel to the rotation axis allowing axial movement of the manifold relative to the shaft.

4. The assembly of claim 3, wherein the manifold is axially constrained by radially extending members mounted to the shaft at opposite axial sides of the manifold.

5. The assembly of claim 1, wherein the shaft includes at least one groove along its periphery at the journal interface receiving flow passing from at least one of the flow passages of the manifold to the disconnect device.

6. The assembly of claim 5, wherein the at least one groove includes an axial groove and a circumferential groove intersecting the axial groove.

7. The assembly of claim 5, wherein the at least one groove includes two axially spaced circumferential channels intersected by an axial groove.

8. The assembly of claim 1, wherein at least one of the flow passages of the manifold pass flow to the disconnect device without passing through the journal interface.

9. A disconnect device control assembly for a transmission of a work vehicle, the assembly comprising:
   a shaft having a rotation axis extending through a housing of the transmission;
   a disconnect device mounted for co-rotation with the shaft about the rotation axis and having a disengaged condition and an engaged condition;
   a gear carried by the shaft to rotate about the rotation axis, the gear interacting with the disconnect device to rotate relative to the shaft in the disengaged condition of the disconnect device and to co-rotate with the shaft in the engaged condition of the disconnect device; and
   a manifold carried by the shaft and rotationally fixed relative to the rotation axis, the manifold defining a plurality of flow passages configured to route flow to the disconnect device;
   wherein the manifold has an inner periphery that engages the shaft at a journal interface defining a flow passage for flow to pass from at least one of the flow passages of the manifold to the disconnect device;
   wherein the disconnect device is a clutch that includes an actuator piston; and
   wherein the flow passages of the manifold include a clutch control passage and a clutch lubrication passage; the clutch control passage being configured to route relatively high pressure flow to an upstream side of the actuator piston, and the clutch lubrication passage being configured to route relatively low pressure flow to the journal interface and therefrom to a downstream side of the actuator piston.

10. The assembly of claim 1, further including:
    a second disconnect device mounted for co-rotation with the shaft about the rotation axis and having a disengaged condition and an engaged condition; and
    a second gear carried by the shaft to rotate about the rotation axis, the second gear interacting with the second disconnect device to rotate relative to the shaft in the disengaged condition of the second disconnect device and to co-rotate with the shaft in the engaged condition of the second disconnect device;
    wherein the manifold is disposed about the shaft between the disconnect device and the second disconnect device along the rotation axis; and
    wherein the flow passages of the manifold and the journal interface are configured to route flow to the disconnect device and the second disconnect device.

11. The assembly of claim 10, wherein the disconnect device is a clutch having an actuator piston, and the second disconnect device is a second clutch having an actuator piston; and
    wherein the flow passages of the manifold include a clutch lubrication passage and two clutch control passages, the clutch lubrication passage being configured to route relatively low pressure flow to the journal interface and therefrom to a downstream side of each actuator piston of the clutch and the second clutch, and the control passages being configured to route relatively high pressure flow to an upstream side of each actuator piston of the clutch and the second clutch.

12. The assembly of claim 11, wherein the shaft includes at least one groove along its periphery at the journal interface receiving flow passing the clutch lubrication passage; and wherein the at least one groove includes three axially spaced circumferential channels intersected by at least one axial groove.

13. A clutch control assembly for a transmission, comprising:

a shaft having a rotation axis extending through a housing of the transmission;

a clutch mounted for co-rotation with the shaft about the rotation axis, the clutch having an actuator piston and a friction pack movable into a disengaged condition and an engaged condition;

a gear carried by the shaft to rotate about the rotation axis, the gear interacting with the clutch to rotate relative to the shaft in the disengaged condition of the clutch and to co-rotate with the shaft in the engaged condition of the clutch; and a manifold carried by the shaft and rotationally fixed relative to the rotation axis, the manifold defining a plurality of flow passages configured to route flow to the clutch;

wherein the manifold has an inner periphery that engages the shaft at a journal interface defining a flow passage for flow to pass from at least one of the flow passages of the manifold to the clutch; and wherein the flow passages of the manifold include a clutch control passage and a clutch lubrication passage; the clutch control passage being configured to route relatively high pressure flow to an upstream side of the actuator piston, and the clutch lubrication passage being configured to route relatively low pressure flow to the journal interface and therefrom to a downstream side of the actuator piston.

14. The assembly of claim 13, wherein the manifold is restrained against rotation about the rotation axis by a pin and slot arrangement in which the slot has a long dimension substantially extending parallel to the rotation axis allowing axial movement of the manifold relative to the shaft.

15. The assembly of claim 13, further including:

a second clutch mounted for co-rotation with the shaft about the rotation axis, the second clutch having a second actuator piston and a second friction pack movable into a disengaged condition and an engaged condition; and a second gear carried by the shaft to rotate about the rotation axis, the second gear interacting with the second clutch to rotate relative to the shaft in the disengaged condition of the second clutch and to co-rotate with the shaft in the engaged condition of the second clutch; and wherein the manifold is disposed about the shaft between the clutch and the second clutch along the rotation axis; and wherein the flow passages of the manifold include a second control passage configured to route flow to an upstream side of the second actuator piston.

16. A transmission for a work vehicle, comprising:

a transmission housing;

a transmission shaft mounted to the housing for rotation about a rotation axis;

a gear carried by the shaft to rotate about the rotation axis; and a clutch control assembly including:

a clutch mounted for co-rotation with the shaft about the rotation axis and having a disengaged condition in which the gear rotates relative to the shaft and an engaged condition in which the gear co-rotates with the shaft; and a manifold carried by the shaft and rotationally fixed relative to the rotation axis, the manifold defining a plurality of flow passages configured to route flow to the clutch;

wherein the manifold has an inner periphery that engages the shaft at a journal interface defining a flow passage for flow to pass from at least one of the flow passages of the manifold to the clutch; and wherein the manifold is restrained against rotation about the rotation axis by a pin and slot arrangement in which the slot has a long dimension substantially extending parallel to the rotation axis allowing axial movement of the manifold relative to the shaft.

17. The transmission of claim 16, wherein the clutch includes an actuator piston;

wherein the flow passages of the manifold include a clutch control passage and a clutch lubrication passage; the clutch control passage being configured to route relatively high pressure flow to an upstream side of the actuator piston, and the clutch lubrication passage being configured to route relatively low pressure flow to the journal interface and therefrom to a downstream side of the actuator piston.

18. The transmission of claim 16, further including:

a second clutch mounted for co-rotation with the shaft about the rotation axis and having a disengaged condition and an engaged condition; and a second gear carried by the shaft to rotate about the rotation axis, the second gear interacting with the second clutch to rotate relative to the shaft in the disengaged condition of the second clutch and to co-rotate with the shaft in the engaged condition of the second clutch;

wherein the manifold is disposed about the shaft between the clutch and the second clutch along the rotation axis; and wherein the flow passages of the manifold and the journal interface are configured to route flow to the clutch and the second clutch.

* * * * *